United States Patent [19]

Easton et al.

[11] Patent Number: 4,899,294

[45] Date of Patent: Feb. 6, 1990

[54] GRAPHICS PROCESSING SYSTEM

[75] Inventors: Colin J. Easton, Romsey; Adrian C. Gay, Fareham, both of United Kingdom

[73] Assignee: International Business Machines Corporation, Armonk, N.Y.

[21] Appl. No.: 121,976

[22] Filed: Nov. 18, 1987

[30] Foreign Application Priority Data

Nov. 18, 1986 [GB] United Kingdom ................. 8627552

[51] Int. Cl.$^4$ ............................................. G06F 15/72
[52] U.S. Cl. .................................. 364/522; 364/521; 364/518; 340/744; 340/747
[58] Field of Search ....................... 364/521, 518, 522; 340/747, 750, 730, 731, 798, 799, 724, 744

[56] References Cited

U.S. PATENT DOCUMENTS

| | | | |
|---|---|---|---|
| 4,425,559 | 1/1984 | Sherman | 340/747 |
| 4,580,231 | 4/1986 | Tidd et al. | 364/521 |
| 4,626,838 | 12/1986 | Tsujioka et al. | 340/744 |
| 4,631,690 | 12/1986 | Carthout et al. | 364/518 |
| 4,677,574 | 6/1987 | Kausch | 364/521 |
| 4,731,742 | 3/1988 | Nishi et al. | 364/521 |
| 4,745,575 | 5/1988 | Hawes | 364/900 |
| 4,788,538 | 11/1988 | Klein et al. | 340/747 |
| 4,791,582 | 12/1988 | Ueda et al. | 364/522 |

OTHER PUBLICATIONS

Foley et al. "Fundamentals of Interactive Computer Graphics", Addison Wesley 1982 pp. 456-461.
Ackland et al. "The Edge Flag Algorithin-A Fill Method for Raster Scan Displays", IEEE Trans. of Computer 1/81 pp, 41-47

Primary Examiner—David L. Clark
Assistant Examiner—Phu K. Nguyen
Attorney, Agent, or Firm—Thomas P. Dowd

[57] ABSTRACT

A graphics processing system has the capability of generating a map of an image in terms of the individual picture elements or pixels from data defining the boundaries of component areas of the image. The disclosed generating system comprises a plurality of paired storage locations, called a convex area table, with each pair of locations being associated with a line of individual picture elements on the image. Processing logic computes display line and displacement values for a component area of the pair of storage locations for the corresponding display line. The stored displacement values can then be used for generating the full pixel map of the image.

14 Claims, 5 Drawing Sheets

GRAPHICS PROCESSING SYSTEM

BACKGROUND OF THE INVENTION

1. Field of the Invention

The present invention involves a graphics processing system for creating a pixel map of an image from data defining image area boundaries for display on display means.

2. Description of the Related Art including imformation disclosed under 37 CFR 1.97 - 1.99

Graphics processing systems can take many forms. There are systems which are particularly dedicated to graphics such as those used in computer aided design. However, many general purpose and other processing systems also provide graphics functions. For example, many text processing systems are provided with facilities for creating charts such as histograms, pie charts, and special images. The use of the term "graphics processing system" as used herein is consequently intended to be interpreted generally to include such systems, that is any system in which information can be represented pictorially rather than or as well as alphanumerically and one or more areas making up an image or pictuure for display can be defined in terms of the boundaries of those areas.

By an "area" is meant a plane figure whose outline or boundary consists of lines and/or curves. Areas can be convex, non-convex and can contain holes. In general terms, therefore, an "area" means a general form of boundary, possibly with holes and self intersections. A polygon is a particular form of area which has a boundary formed from straight lines. An area can be defined in a graphics system in many ways. Generally, however, an area will be defined in terms of line or curve segments. In the case of a polygon, the definitions of the vertices and the straight line segments joining the vertices suffice.

Areas will often be filled with color, patterns and/or shading. In general, this is done to make an image more effective. For example, filling can be used to enable areas to be more readily distinguished (e.g., in bar and pie charts), for highlighting areas of particular importance, or to make images of a three dimensional object more realistic (e.g., in modelling and/or computer aided design systems). The shading itself can , for example, be performed using Gouraud shading. This provides for the smooth shading of flat areas of an image. If an area for display is defined in terms of its edges, it is necessary to determine which points on the final image fall within the area in order that the appropriate locations in the image buffer may be set so as to give the corresponding pixels in the image the correct color and/or intensity.

Most common display devices used today are based on a raster scanning principle (e.g., raster-scanned cathode ray tubes). In order to drive these devices it is necessary to generate the individual picture elements (pixels) making up the image in time with the scanning of the image. Conveniently, this can be done using a screen or image buffer to hold a bit map of the image to be displayed on the display screen at any one time. This creates problems, however, where the areas making up an image are defined in terms of their edges as it is then necessary to process the definitions of the areas to identify the individual image pixels which are occupied by each area and accordingly the coloring and/or shading appropriate for those individual pixels. General aspects of these problems are discussed in Chapter II of foley and Van Dam's book "Fundamentals of Interactive Computer Graphics" (see especially pages 456–461), published By Addison-Wesley in 1982.

In accordance with one prior technique for shading an area, another buffer containing an additional image map called a spare bit plane is provided in addition to the image buffer and each area forming part of the image is separately processed using this additional map. Before each area is processed, the pixel locations in the additional map need to be reset. Then, the edges of an area are computed and locations are set in the additional map. When all the edges of an area have been written into the additional map buffer it is then possible to set individual pixel locations in the image buffer by scanning the additional map and alternately starting filling and stopping filling in corresponding locations in the image buffer map on crossing a set location in the additional map. Once the infilling has been completed, the next area can be treated using the additional map. A technique of this type is described by Ackland and West in their article entitled "The Edge Flag Algorithm - A Fill Method for Raster Scan Displays" which was published in IEEE Transactions in Computers, Vol. C30, pp. 41 to 48 in 1981.

SUMMARY OF THE INVENTION

The present invention therefore, is directed to graphics processing systems of the type comprising: a source of image data defining the boundary of an area forming at least part of an image to be displayed on display means having a plurality of display lines; image storage for a map of the image in terms of the individual picture element for each of plural display lines; and means for generating the image map from the image data for display on the display means. In a graphics processing system according to the present invention, however, the means for generating the image map from the image data comprises a plurality of paired storage locations, each pair of locations being associated with a corresponding display line, and processing means, which initially processes the boundary of the area so as to determine the display lines and displacement along those lines at which sequential boundary points are to be displayed and which stores the displacements of the points in free ones of the pairs of locations for the appropriate display lines as they are determined. The processing means are arranged to continue the initial processing of the boundary either until (1) the displacement of a position is computed where both storage locations of the appropriate display line are occupied by displacement values different from that just computed, in which case the area is non-convex in the displacement direction of the display lines, or until (2) the complete boundary has been processed and at most two different displacement values per display line have been detected and stored in the appropriate storage locations, in which case the area is at least one-dimensionally convex in the displacement direction of the display lines. The area is then processed additionally in either a first or a second further processing mode in accordance with the determination of whether the area is convex or non-convex in said direction.

The graphics processing system in accordance with the invention obviates the need to set up and to process a spare bit plane for shapes which are convex in the displacement direction of the display lines. In the case of areas which are convex in the displacement direction of the display lines it therefore avoids the overhead of having to interrogate each storage location in the additional image buffer to determine the points at which the filling operation is to be turned on and off. It will still be necessary to process areas which are nonconvex in this direction using conventional techniques.

However, since, in practice, a significant number of the areas which are to be processed are convex, the invention provides significant processing advantages over the prior art approaches.

BRIED DESCRIPTION OF THE DRAWINGS

The invention will be described in more detail hereinafter with reference to the accompanying drawings, in which.

DESCRIPTION OF THE PREFERRED EMBODIMENTS

Figures 1A, 1B:
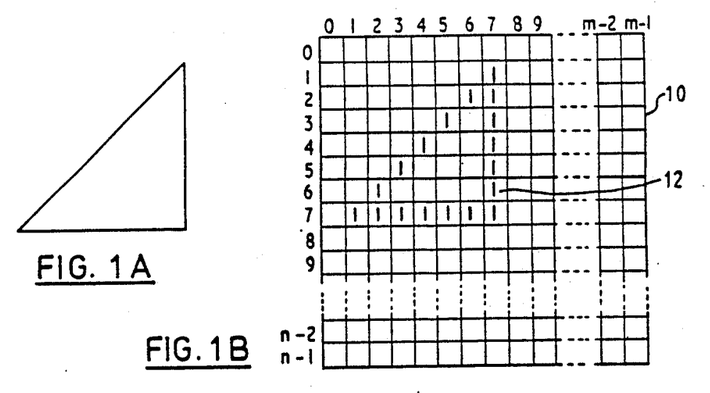
FIG. 1A, 2A and 3A are illustrations of three different areas for display in a graphics processing system.
FIGS. 1B, 2B and 3B are logical representations of the contents of a refresh buffer of a graphics processing system showing, respectively, how the three areas illustrated in FIGs. 1A, 2A and 3A could be reresented therein.
Figures 2A, 2B:
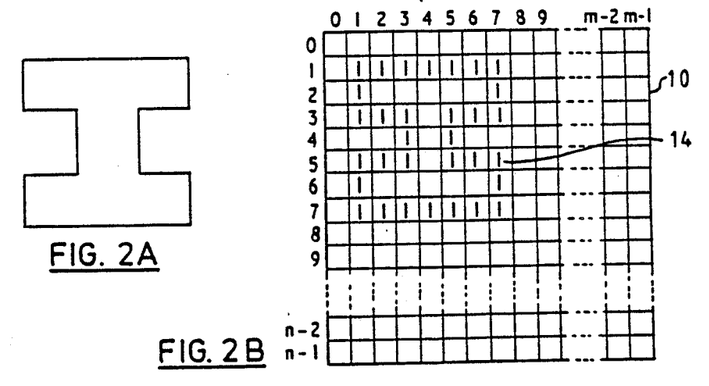
Figures 3A, 3B:
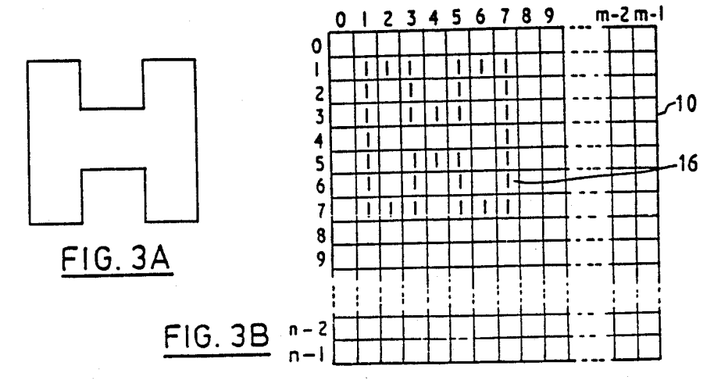

FIGS. 1A, 2A and 3A show in a generalized form three simple shapes or areas which it might be desired to display in a graphics processing system. The areas could define display objects in themselves, or they could form part of a more complex object for display. If the graphics processing system is a word or text processing system with image processing functions they could, for example, represent symbols for use in labelling or generating graphs. Equally, if the graphics processing system is able to process and display representations of three dimensional objects, the areas could form surfaces of such an object. These are however, examples only of what the areas represent and it will be appreciated by those skilled in the art that the actual signification of the areas is immaterial to the teaching of the invention.

Graphics processing systems, as has already been said, come in many different forms. Likewise, the display subsystems that they incorporate also come in many forms. Commonly, however, display subsystems are based on elemental image techniques where an image is made up of a matrix of individual picture elemets. Examples of such display subsystems are raster-scaned display screens and dot martix printers. It should be noted that references to displaying and the like in this specification are intended to cover displaying by means of a printer. In order to effect the display of an image in scanning display subsystems for example, an image buffer can be provided in which an image to be displayed is stored in terms of the individual picture elements (pixels) making up the image, and then the individual elements are accessed in synchronism with the scanning of the display device. In the case of a cathode ray tube device for example, the image buffer will be accessed repeatedly and generally termed a refresh buffer. There need not be a separate image buffer, however, as the storage for the image may be provided by the display device itself as is the case, for example, in gas panel displays. The present invention is directed to graphics processing systems incorporating image storage for an image to be displayed, in which storage a map of the image is built up in terms of the individual picture elements on each of plural display lines. By a display line is simply meant a line of individual picture elements. A display line could, but need not be a scan line on a raster-scanned display.

FIGS. 1B, 2B and 3B illustrate, respectively, how the shapes shown in FIGS. 1A, 2A and 3A could be represented in the image storage of a graphics processing system by setting the bits corresponding to the appropriate pixel locations. In these figures, a set bit is indicated by a "1". It should be noted that FIGS. 1B, 2B and 3B are merely logical representations of the storage of image information and that the physical storage of the information need not be in the form shown (e.g., the information could be stored in a linear form rather than two dimensionally).

Although the image buffer of the graphics processing system is arranged on a pixel basis, the system would require an immense amount of storage if all the possible images to be displayed were stored on the same basis. In the case of images made up of areas which are filled with color, shading and/or a pattern this would be particularly inefficient. In practice it is usual to store such images in alternative, more efficient ways. One possible way is in terms of data defining the edges and possibly the color and/or shading and/or pattern for the areas making up the image. There are other possibilities, but the present invention is concerned with systems of this general sort where the areas making up the image can be defined in terms of the boundaries of those areas.

Figure 4:
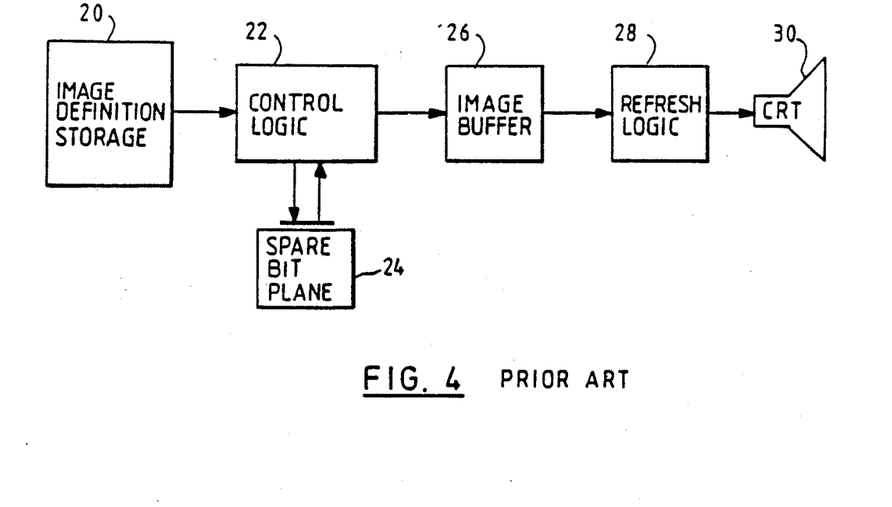
FIG. 4 is a block diagram showing functional units of a prior art graphics processing system.

In such systems, it is necessary to process the area definitions from storage in order to generate the pixel information for the display. FIG. 4 shows a logical arrangement of elements of a prior art system such as that mentioned above. The prior system comprises a cathode ray tube device 30, driven by refresh logic 28 using pixel information in an image buffer 26. In the prior graphics processing system, a buffer called a spare bit plane 24 is provided in addition to the image buffer 26. When processing an image for display, each of the component areas of the image is processed in turn.

The original area definitions can be stored in image definition storage 20 in terms of the edges and information defining the color and/or shading and/or pattern for each area. The detailed storage methodology used is not important to the functioning of this prior system. The definitions of the data defining each area could be linked by a conventional data structure such as linked lists, tables and so on. Alternatively the area definition data could be down loaded from a host processor or generated in real-time rather than being stored in storage 20.

Before each area is processed, the spare bit plane locations have to be reset. Then, each edge of an area is processed in turn to determine the individual pixel locations crossed by the edges and the corresponding locations in the spare bit plane are set. The processing is performed by the control logic 22. When all the edges of the area have been processed and the corresponding bit positions in the spare bit plane set, it is then possible to set up the area in the image buffer 26. The spare bit plane could have the same logical structure as the image buffer (see FIGS. 1B, 2B, 3B and the description thereof).

The filled area is created in the image buffer by scanning the spare bit plane and the image buffer in synchronism and alternately starting writing and stopping writing information into the image buffer on crossing a set location in the spare bit plane. At the same time the set locations in the spare bit plane can be reset to avoid needing a separate resetting operation before processing a subsequent area. The actual information written for the individual picture elements of an area in the image buffer is dependant on the color and/or shading and/or pattern information for that area. Subsequent areas can then be processed using the spare bit plane until a complete image including all the filled areas is stored in the image buffer.

It will be appreciated that this is a time consuming process, due to the necessity to interrogate and process all of the individual locations in the spare bit plane, and despite a high processing rate, it nevertheless can lead to delays in the generation of screens of display data, which delays are noticeable to an operator and/or limit the complexity of images which can be processed at a given refresh rate.

The system of the present invention provides improved performance in that, for many images, it is not necessary to use the spare bit plane when filling in areas. The invention is based on the principle that a straight line drawn through a convex shape will only cross the boundary of that shape at two places at most. Thus, any straight line drawn through the triangle in FIG. 1A will cross the boundary at two places at most.

The "I" shape in FIG. 2A can be said to be "one-dimensionally convex" in the horizontal direction because any horizontal line drawn through it will cross the boundary at two places at most. It is not however convex in the vertical direction because a vertical line to the left or right of the central part of the "I" will cross the boundary at four places. Similarly the "H" shape in FIG. 3A is convex in the vertical, but not in the horizontal direction.

The normal method for determining the convexity of a polygon uses Euclid's Theorem. In accordance with this theorem, a polygon is convex if the sum of its interior angles is not greater than 360 degrees. It would be possible therefore to determine whether a polygon is convex using the signs of the vector cross products of the polygon edges or by counting polygon vertex inflexions. In either case, however, this involves a pre-processing pass of the polygon vertices and significant calculation to determine whether the polygon is convex. Moreover, this technique cannot be used for areas in general (unless the area is de-composed into straight line approximations), but only for polygons.

Figure 6:
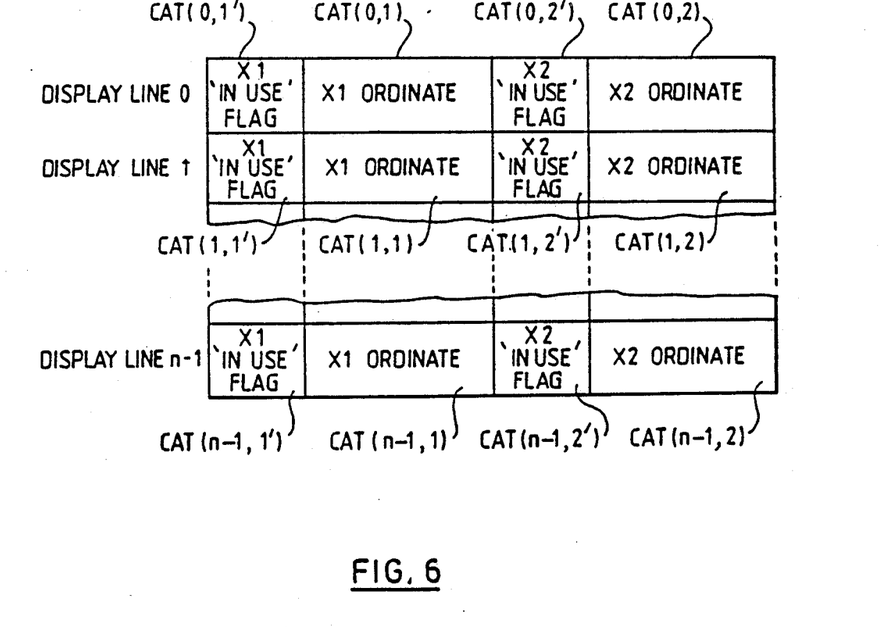
FIG. 6 is an illustration of a convex area table which forms part of the graphics processing system of FIG. 5.

The present invention overcomes the disadvantages of the prior art by the provision of a logical structured storage element called a convex area table. A possible logical configuration for this storage element is shown in FIG. 6. The convex area table shown in FIG. 6 has the capacity to store two "x" ordinate values or displacements along each of the scan lines on the display image. It is assumed in FIG. 6 and in the following description that the "display lines" are horizontal. FIG. 6 also shows an "in-use flag" for each of the storage locations for the "x" ordinates, although this is not essential as will be explained later.

Figure 5:
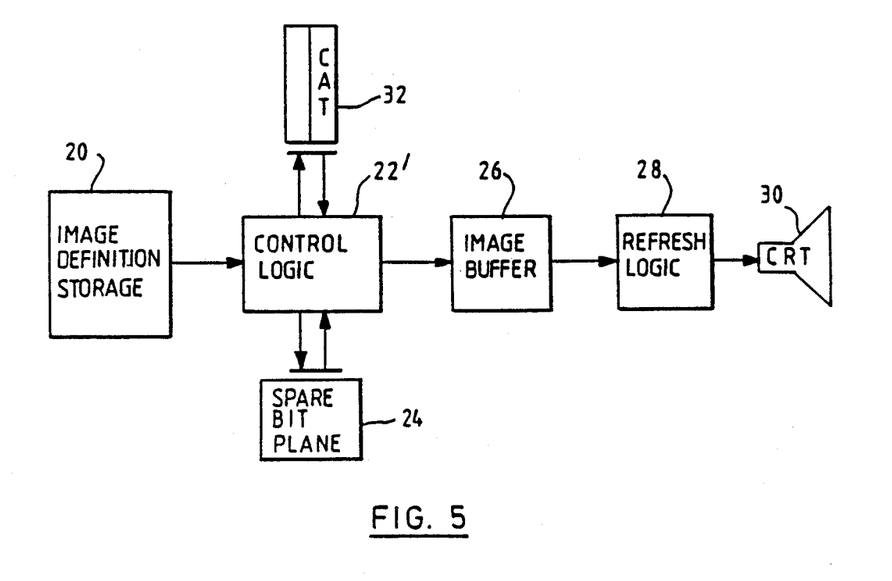
FIG. 5 is a block diagram showing functional units of the graphics processing system in accordance with the present invention.

FIG. 5 shows an arrangement of logical elements, including the convex area table 32, of a graphics processing system in accordance with the present invention. Logical elements which are also found in the prior art system have the same numbering as in FIG. 4.

The operation of a graphics processing system in accordance with the present invention will now be explained, by way of example, with reference to FIGS. 5, 6 and 7.

As in the prior art arrangement, the original area definitions can be stored in the image definition storage 20 in terms of the edge and in-fill information defining the color and/or shading and/or pattern for each area. The detailed storage methodology used is not important to the functioning of the present system. The definitions of the data defining each area could be linked by a conventional data structure such as linked lists, tables and so on. As in the prior art arrangement, the provision of the image definition storage 20 is not essential as the area definition data could, for example, be generated in real time or down loaded from a host processor connected to the graphics processing system.

Before each area is processed, the convex area table needs to be reset. Then, as in the prior system, each edge of an area is processed in turn to determine the individual pixel locations crossed by the edge. In the system of FIG. 5 this processing is performed by the control logic 22' which differs in operation from the control logic 22 in FIG. 4 in a manner as will be apparent from the following.

The control logic 22' computes a display line and the displacement along that display line at which sequential incremental positions on an edge currently being processed are to be displayed. This can be done using any suitable algorithm, for example Bresenham's algorithm as described on pages 433–436 of Foley and Van Dam's book referred to earlier. If the display line on which a particular point is to be displayed is not the same line as the immediately preceding point on that edge is on, then the control logic 22' examines the pair of locations in the convex area table corresponding to the appropriate display line to determine whether one or both locations are already occupied by displacement values. An algorithm which enables a point to be selected if it is for a different display line than the preceding point is described in J. E. Bresenham's article "Run Length Slice Algorithm for Incremental Lines" which was published in "Fundamental Algorithms for Computer Graphics", NATO ASI Series; Computer and Systems Sciences, Vol 17, pages 59 to 104 in 1985. In this way, the control logic 22' ensures that only one point per display line is considered for an edge, or that a part of the edge is nearer to being horizontal than vertical. What happens next depends on the result of the examination.

If neither of the two storage locations are occupied, the newly caluclated "x" value is stored in one of those locations.

If one "x" value has already been stored in one of the pair of locations for the scan line in question, and the newly calculated "x" ordinate value is different from that already stored, then the newly calculated "x" ordinate value is stored in the free one of the paired locations.

If it is determined that the newly computed "x" ordinate is the same as an "x" ordinate value already stored in the pair of locations for the current scan line, the newly computed "x" ordinate is discarded.

If both of the locations for that scan line are occupied by "x" ordinate values different from that just computed, then the logic 22' designates the ared under consideration non-convex and causes the area to be processed using the spare bit plane 24.

If all the edges of the area are processed without the logic 22' designating the area under consideration as non-convex and consequently all the appropriate locations in the convex area table 32 have been set, it is then possible to fill in the area without using the spare bit plane 24. In this, the first filling mode, the contents of the convex area table 32 are used to determine the individual picture element locations to be set in the image buffer 26. It should be noted that this operation will normally be independent of the scanning of the image buffer 26 in synchronism with the scanning of the display 30 for actually displaying the image.

In the first filling mode, therefore, the convex area table 32 is examined by the control logic 22'. If no "x" ordinate (displacement) values for a particular display line have been stored, this means that no part of the area lies on that display line and, consequently, that the line can be ignored as far as that area is concerned.

If two values have been stored for a display line in the convex area table 32, this means that part of the display line between the two displacement values stored needs to filled in by the control logic. This means that information is written on the display line in question from the location corresponding to the lower displacement value to that corresponding to the higher value. The actual information written is dependent on the color and/or shading and/or pattern data for the area. Whether information is actually written at the boundary locations depends on how adjacent areas are to be displayed. For example, the location corresponding to the lower displacement value could be written, but the corresponding higher value left blank. In this way double writing at a location where two areas meet can be avoided. To simplify processing at this stage, displacement values could first be ordered within the pair of locations for a display line so that the displacement value in the first location is lower than that in the second. It would then only be necessary to examine one location at a time.

If only one displacement value has been stored for that line, this means that the area meets at a singularity. This could either be a vertex of the area or it could be the meeting point of two separate convex areas such as the point where the two round areas of a FIG. 8 meet. In either case, no filling in is necessary. A single point can be written or not into the image buffer, as preferred. Once again, this choice depends on how adjacent areas are to be displayed.

In accordance with the second filling mode (i.e., when the area is determined to be non-convex in the display line displacement direction) the spare bit plane 24 is used in a manner similar to that known from the prior art. The information already stored in the convex area table 32 can be used when drawing the boundary information in the spare bit plane 24.

In both the first and second filling modes, as the information is read from the convex area table 32, the locations read can be reset in preparation for processing a subsequent area.

The provision of the in-use flags (FIG. 6) simplifies the control of the convex area table 32. When the table 32 is reset before the processing of an area is started, it is only necessary to reset the flage. If, on the other hand they are not provided, all the displacement values will have to be reset to some value which represents, for example, an invalid pixel location. Similarity, when determining whether two, one or no displacement values have been stored for a particular display line, it is only necessary to examine the flags in the first instance. As this merely involves a binary test, this is more efficient than a full comparison operation which would be needed if the use of an invalid pixel location were used to identify an "unoccupied" location in the convex area table 32.

Figure 7:
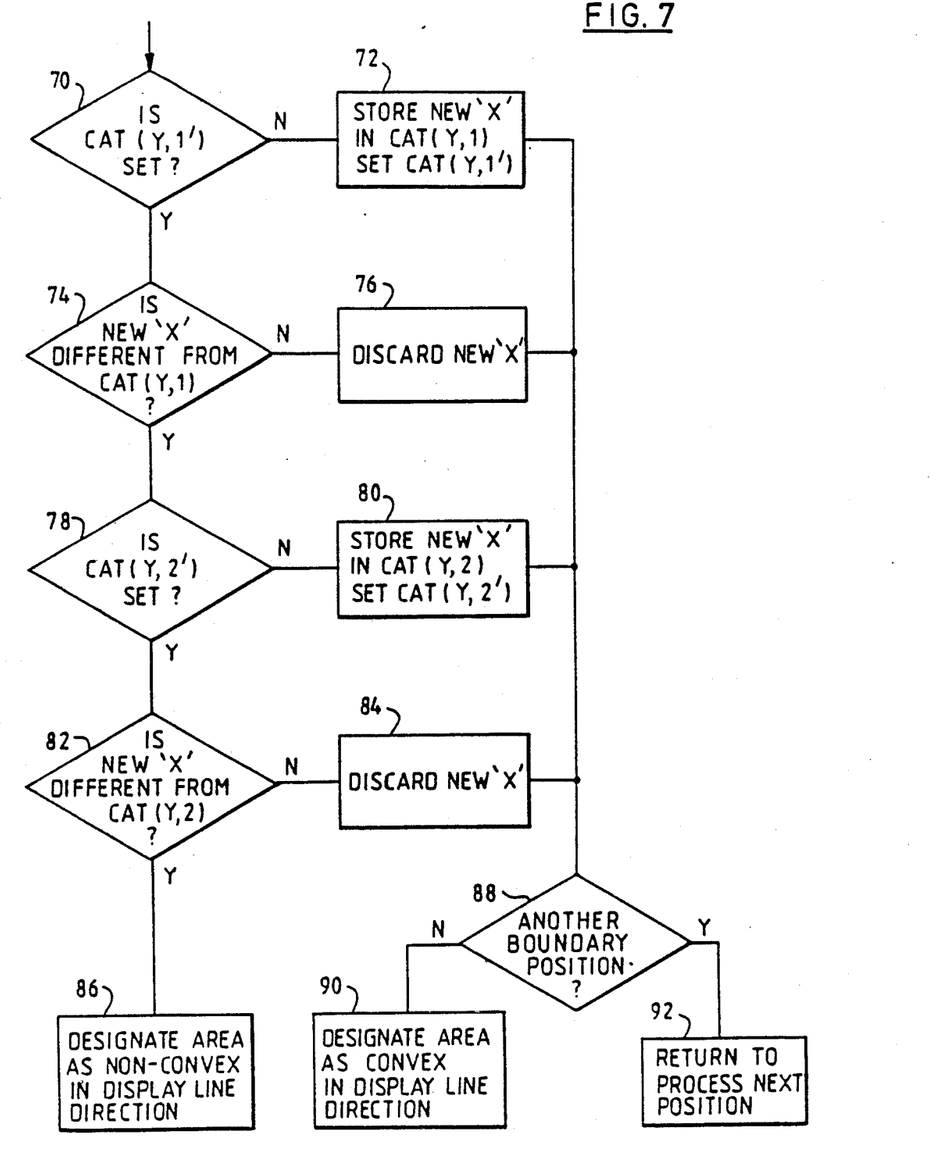
FIG. 7 is a flow diagram illustrating the operation of control logic in the system of FIG. 5.

FIg. 7 is a flow diagram of a particular algorithm for determining whether an area is convex or not in the direction of the display lines for an image using a convex area table with in-use flags.

In accordance with this algorithm a first test, 70, is made to determine whether the first one of the appropriate pair of locations in table 32 is occupied. If it is not, then the newly computed "x" ordinate (displacement) value is stored, 72, in that first location, the in-use flag for that location is set, and the next position on the boundary of the area can be considered, 88. If it is already occupied, the newly computed "x" ordinate value is compared, 74, to the stored value. If they are equal, the newly computed value is discarded, 76, and the next position on the boundary of the area is considered, 88. If they are not equal, the second one of the pair of locations is then considered.

A test, 78, is made to determine whether the second "x" ordinate value is occupied. If it is not, then the newly computed "x" ordinate value is stored, 80, therein, the in-use flag for that location is set, and then the next position on the boundary of the area can be computed, 92. If it is already occupied, the newly computed "x" ordinate value is compared, 82, to the value stored in said second location. If they are equal, the newly computed "x" ordinate value is discarded, 84, and the next position on the boundary of the area is considered, 88. If they are not equal, then the control logic 22' designates, 86, the area as being non-convex in the displacement direction of the display lines and processing of the area using the spare bit plane 24 is invoked. If, upon consideration, 88, the newly calculated "x" value is for the last position on the boundary of the area to be considered and the answer to all the tests 70, 74, 78 and 82 was negative, then the control logic 22' designates, 90, the area as being at least one-dimensionally convex in the direction of the display lines and the area can be filled without using the spare bit plane 24.

Figure 8:
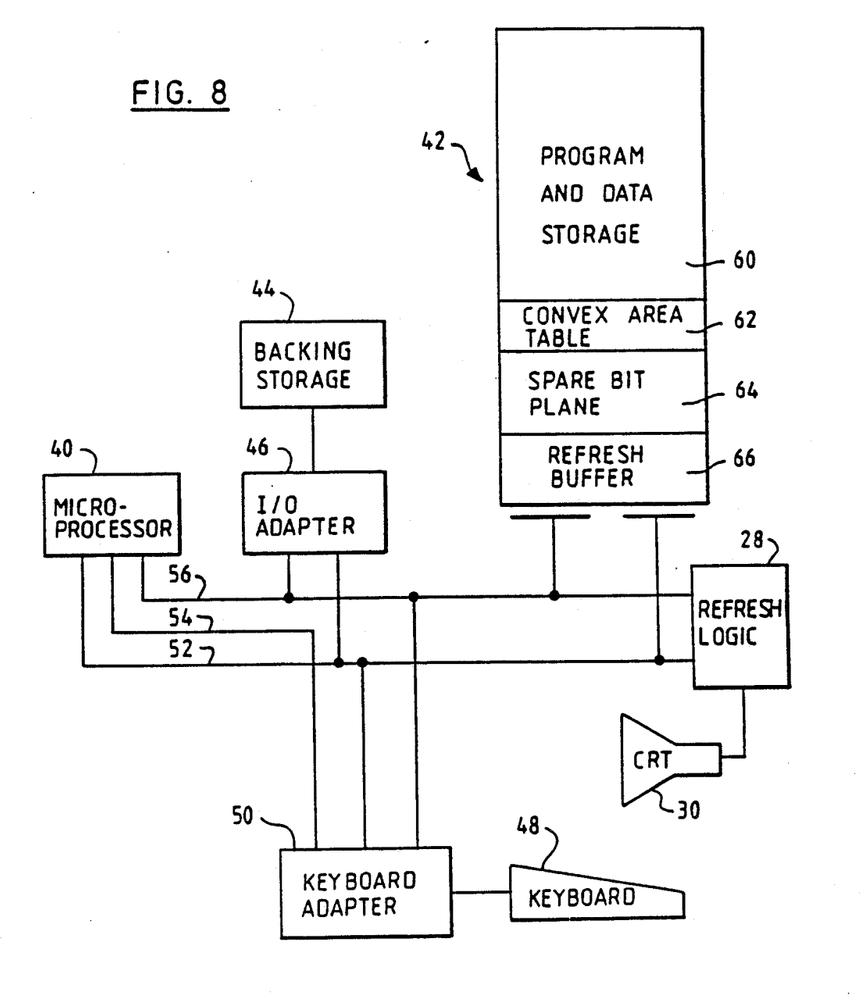
FIG. 8 is a block diagram of a physical implementation of the graphics processing system of FIG. 5.

A specific implementation of a graphics processing system in accordance with the invention is shown in FIG. 8. In this implementation the functional elements shown in FIG. 6 are configured in a personal computer by conventional programming techniques. The personal computer comprises a microprocessor 40, main storage 42, a keyboard 48, and a cathode ray tube display 30. The operation of the cathode ray tube device is controlled by refresh citcuitry 28. The microprocessor 40 can be of any suitable type as will be evident to a person skilled in the art. The keyboard 48 is connected to the bus via a keyboard adapter 50. Backing storage 44 with an associated I/O adapter 46 can also be provided. The individual units are connected to one another by a bus comprising data bus lines 56, control bus lines 52 and an interrupt line 54 in a conventional manner. The personal computer could, of course be provided, in a conventional manner, with connections to further personal computers and/or host processors.

The functional units shown in FIG. 6 are implemented by means of suitable programming. As shown in FIG. 8, a first part 60 of main memory 42 is reserved for programs and data. In this part of memory, therefore, computer software is stored, which, in combination with the hardware elements of the system provide the functions of the control logic 22' shown in FIG. 6. In addition, the data specifying the image to be displayed (i.e., the data contained in the image definition storage 20 shown in FIG. 6) can be stored in this first part of main memory. Parts 62, 64 and 66 of storage in the main memory are provided, respectively, for the convex area table 32, the spare bit plane 24 and the refresh buffer 26 shown in FIg. 6. It should be noted that FIG. 8 shows the various parts 60, 62, 64 and 66 of storage as unitary blocks purely for the simplicity of illustration. In practice, the various parts of storage (the block 60, the convex area table 62, etc.) could be distributed throughout main memory. Indeed, it is also possible for part or all of the data, and for software as necessary to be stored on backing storage and for this to be brought into main memory only when needed.

It is not considered necessary to indicate the details of the programming needed in order to implement the present invention using a personal computer as it will be evident to the skilled person how to carry this out in the light of the information given in this specification.

It will be appreciated that the present invention is not limited to the specific implementation described hereinabove. The present invention could equally be implemented by means of a new hardware structure incorporating the necessary functional elements, or could be implemented on other general purpose computers.

It will be apparent to the skilled person that other modifications are possible within the scope of the claims. For example, although it is most convenient that the display lines mentioned on FIG. 6 correspond to the scan lines of a display screen or a raster printer head, this in not essential. The mimage buffer 26 could, for example, be loaded by accessing it using horizontal sweeps, whereas the display itself could be scanned vertically and consequently the image buffer read vertically during scanning of the display screen and vice versa. As has been mentioned, the image storage may be performed by the display itself (e.g., gas panel displays) rather than an image buffer.

Having thus described our invention what we claim as new and desire to secure as Letters Patent, is:

1. A graphics processing system of the type comprising:
   a source of image data defining the boundary of an area forming at least part of an image to be displayed on a display having a plurality of display lines;
   image storage defining a map of said image in terms of the individual picture elements for each of plural display lines; and
   means for generating an image map from said image data, wherein said generating means comprises:
   means for defining a plurality of paired storage locations in said image storage, each of said pairs of locations being associated with a corresponding one of said plural display lines and each of said storage locations being capable of being occupied by a computed displacement value of a sequential boundary point;
   processing means for initially processing said image data by computing the displacements along each display line at which sequential boundary points are to be displayed and producing respective displacement values in accordance therewith;
   means for detecting whether said storage locations are occupied by displacement values and storing the computed displacement values of the points, as they are computed, in storage locations for their respective display lines, that are not already occupied by displacement values;
   means for determining if said area is non-convex in the displacement direction of the display lines by determining whether both storage locations of a given display line are occupied by displacement values different from the displacement value just computed therefor by said porcessing means and for producing a first indication, in response to a positive determination, indicating that said area is nonconvex;
   means for determining if the complete boundary of said area has been processed and at most two different displacement values per display line have been detected and stored in the appropriate storage locations, and for providing a second indication, in response to a positive determination, indicating said area is at least one dimensionally convex in the displacement direction of the display lines; and
   control means for reactuating said processing means to continue the processing of said image data in either a first or a second further processing mode, respectively in response to said first or second indications, to generate an image map from said image data.

2. A graphics processing system as in claim 1 wherein the boundary of said area comprises a plurality of edge segments and said processing means further comprises means for processing each of said edge segments of said boundary in turn when processing said image data.

3. A graphics processing system as in claim 1 further comprising:
   in-use flag means, associated with each of said paired storage locations, for indicating when a displacement value is stored in a location;
   means for setting the flag means associated with a location when a displacement value is stored in that location; and wherein
   said means for determining whether a displacent value has been stored in a location further comprises means for testing for whether the corresponding flag means has been set.

4. A graphics processing system as in claim 1 wherein the image data of said source comprises a definition of at least one of the color and shading and pattern data for filling in said area in addition to the boundary data for said area, and said processing means further comprises:
   means for reading the contents of the pair of locations associated with a display line of said area; and
   means for setting the individual picture elements on said display line in the image map of said image storage in accordance with the displacement information in said pair of storage locations and at least one of the color and shading and pattern data for said area.

5. A graphics processing system as in claim 4 wherein said image storage comprises means for storing a map of an area in terms of the individual picture elements for each of plural display lines, said stored map being capable of use to form at least part of said image map, and wherein said processing means further comprises:

(1) means for setting the individual picture elemets in said stored area map at positions defined by the stored displacement values in said second processing mode; and (2) means for then setting the individual picture elements on a display line in said image map in accordance with the boundary information on the corresponding display line in said area map and at least one of the color and shading and pattern data for said area.

6. A graphics processing system as in claim 5 wherein said processing means further comprises:

(3) means for using, in said second processing mode, the data stored in the paired stored locations to write boundary information into the area map; and (4) means for then completing the boundary information in the area map using the boundary data from said source.

7. A graphics processing system as in claim 1 further comprising raster- scanned display means having scan lines corresponding to said display lines, for displaying said image.

8. A graphics processing method for creating a pixel map of an image, from data defining image area boundaries, for display on a display having a plurality of display lines, comprising the steps of:

compiling a source of image data defining the boundary of an area forming at least part of an image to be displayed on a display having a plurality of display lines;

providing image storage defining a map of said image in terms of the individual picture elements for each of plural display lines; and generating an image map from said image data, by the steps comprising:

defining a plurality of paired storage locations in said image storage, each of said paris of locations being associated with a corresponding one of said plural display lines and each of said storage locations being capable of being occupied by a computed displacement value of a sequential boundary point;

initially processing said image data by computing the displacements along each display line at which sequential boundary points are to be displayed and producing respective displacement values in accordance therewith;

detecting whether said storage locations are occupied by displacement values and storing the computed displacement values of the points, as they are computed, in storage locations for their respective display lines, that are not already occupied by displacement values;

determining if said area is non-convex in the displacement direction of the display lines by determining whether both storage locations of a given display line are occupied by displacement values different from the displacement value just computed therefor by said initial processing step and producing a first indication, in response to a positive determination, indicating that said area is non-convex;

determining if the complete boundary of said area has been processed and at most two different displacement values per display line have been detected and stored in the appropriate storage locations, and providing a second indication, in response to a positive determination, indicating said area is at least one dimensionally convex in the displacement direction of the display lines; and continuing the processing of said image data in either a first or a second further processing mode, respectively in response to said first or second indications, to generate a pixel map of said image for display on a display having a plurality of display lines.

9. A graphics processing method as in claim 8 wherein the boundary of said area comprises a plurality of edge segments and said processing further comprises processing each of said edge segments of said boundary in turn when processing said image data.

10. A graphics processing method as in claim 8 further comprising the steps of:

providing in-use flags, associated with each of said paired storage locations, for indicating when a displacement value is stored in a location;

setting the flag associated with a location when a displacement value is stored in that location; and determining whether a displacement value has been stored in a location by testing for whether the corresponding flag has been set.

11. A graphics processing method as in claim 8 wherein the image data of said source comprises a definition of at least one of the color and shading and pattern data for filling in said area in addition to the boundary data for said area, and said processing further comprises:

reading the contents of the pair of locations associated with a display line of said area; and setting the individual picture elements on said display line in the image map of said image storage in accordance with the displacement information in said pair of storage locations and at least one of the color and shading and pattern data for said area.

12. A graphics processing method as in claim 11 wherein said image storage comprises the steps of:

storing a map of an area in terms of the individual picture elements for each of plural display lines, said stored map being capable of use to form at least part of said image map, and wherein said processing further comprises:

(1) setting the individual picture elements in said stored area map at positions defined by the stored displacement values in said second processing mode; and (2) then setting the individual picture elements on a display line in said image map in accordance with the boundary information of the corresponding display line in said area map and at least one of the color and shading and pattern data for said area.

13. A graphics processing method as in claim 12 wherein said processing further comprises:

(3) using, in said second processing mode, the data stored in the paired stored locations to write boundary information into the area map; and (4) then completing the boundary information in the area map using the boundary data from said source.

14. A graphics processing method as in claim 8 comprising further step of using raster-scanned display means, having scan lines corresponding to said display lines, for displaying said image.

* * * * *